(12) United States Patent
Sadashivappa

(10) Patent No.: US 9,251,900 B2
(45) Date of Patent: Feb. 2, 2016

(54) DATA SCRAMBLING BASED ON TRANSITION CHARACTERISTIC OF THE DATA

(75) Inventor: Dayananda Yaraganalu Sadashivappa, Karnataka (IN)

(73) Assignee: SANDISK TECHNOLOGIES INC., Plano, TX (US)

( * ) Notice: Subject to any disclaimer, the term of this patent is extended or adjusted under 35 U.S.C. 154(b) by 1099 days.

(21) Appl. No.: 13/307,610

(22) Filed: Nov. 30, 2011

(65) Prior Publication Data

US 2013/0124781 A1   May 16, 2013

(30) Foreign Application Priority Data

Nov. 15, 2011   (IN) .......................... 3919/CHE/2011

(51) Int. Cl.
*H04L 9/00* (2006.01)
*G11C 16/10* (2006.01)
*G11C 7/10* (2006.01)

(52) U.S. Cl.
CPC .............. *G11C 16/10* (2013.01); *G11C 7/1006* (2013.01)

(58) Field of Classification Search
None
See application file for complete search history.

(56) References Cited

U.S. PATENT DOCUMENTS

| | | | |
|---|---|---|---|
| 6,016,275 A | 1/2000 | Han | |
| 7,353,400 B1 | 4/2008 | Folmsbee | |
| 7,730,300 B2 | 6/2010 | Candelore | |
| 2001/0034715 A1* | 10/2001 | Shibata et al. | 705/57 |
| 2004/0105549 A1* | 6/2004 | Suzuki et al. | 380/278 |
| 2005/0055495 A1 | 3/2005 | Vihmalo et al. | |
| 2007/0189525 A1* | 8/2007 | Wajs | 380/42 |
| 2007/0258583 A1* | 11/2007 | Wajs | 380/42 |
| 2009/0067621 A9* | 3/2009 | Wajs | 380/42 |
| 2009/0092251 A1* | 4/2009 | Domosi | 380/255 |
| 2009/0204824 A1 | 8/2009 | Lin et al. | |
| 2009/0279362 A1 | 11/2009 | Stern et al. | |
| 2009/0282267 A1 | 11/2009 | Stern et al. | |
| 2010/0070682 A1 | 3/2010 | Wan et al. | |
| 2011/0022851 A1* | 1/2011 | Yokota et al. | 713/189 |
| 2011/0096926 A1* | 4/2011 | Chandrasekaran | 380/259 |
| 2014/0112468 A1* | 4/2014 | Yamashita | G09C 1/00 380/28 |

* cited by examiner

*Primary Examiner* — Christopher Revak
(74) *Attorney, Agent, or Firm* — Toler Law Group, PC (57) ABSTRACT

A method of storing data includes receiving data to be written to a memory device. The method includes selecting a scrambling operation from at least a first scrambling operation and a second scrambling operation. The scrambling operation is selected based on a transition characteristic associated with the data. The method includes scrambling the data according to the selected scrambling operation and storing the scrambled data in the memory device. Additionally, the method may include descrambling the scrambled data to produce descrambled data.

22 Claims, 9 Drawing Sheets

DATA SCRAMBLING BASED ON TRANSITION CHARACTERISTIC OF THE DATA

REFERENCE TO EARLIER-FILED APPLICATIONS

This application claims priority from Indian Application No. 3919/CHE/2011, filed Nov. 15, 2011, the content of which is incorporated by reference herein in its entirety.

FIELD OF THE DISCLOSURE

The present disclosure is generally related to data storage and retrieval.

BACKGROUND

Capacity to store data in memory devices improves with advances in technology. Data may be stored at a non-volatile storage device such as a flash memory device. Reliability of data stored at a non-volatile storage device can be compromised by proximity effects of memory storage elements that are situated near one another. Program disturb is one such proximity effect that may cause data storage errors resulting from neighboring memory locations that are electrically charged within a non-volatile storage device.

Data may be scrambled prior to storage in a memory device. Scrambling breaks up patterns, such as a series of "1"s (ones) or a series of "0"s (zeros). However, scrambling increases latency of data operations and may increase manufacturing costs. Under some conditions, scrambling may cause an increase in error rate associated with storage of the data.

SUMMARY

Reliability of stored data may be improved by scrambling the data prior to storage based on a characteristic of the data. Prior to storage, data may be analyzed to determine a transition characteristic associated with the data. For example, the transition characteristic may indicate a high spatial concentration of data having identical values (e.g., a series of "1"s). The transition characteristic may be used to select a key with which to scramble the data. The data may be scrambled by a logical operation using the selected key. For example, the data may be scrambled using a bit-wise exclusive-OR operation with the selected key. The scrambled data may be stored at a non-volatile memory device, and a key indicator associated with the selected key may also be stored at the non-volatile memory device. Subsequently, the scrambled data and the key indicator may be retrieved from the memory device, and the scrambled data may be descrambled according to the key associated with the key indicator.

Scrambling the data based on the transition characteristic enables selection of an appropriate scrambling operation for each set of data. Avoiding inappropriate scrambling operations may result in reduction of errors in the stored data. Consequently, reliability of the data that is stored in the non-volatile storage device may be improved.

DETAILED DESCRIPTION

Methods and devices are described that process data prior to storage in order to reduce errors in stored data at a non-volatile memory device (e.g., errors due to proximity effects such as program disturb). A particular scrambling method that may be used to scramble data may be selected based on one or more characteristics of the data to be stored. The one or more characteristics may be calculated from values of the data to be stored. By selecting the particular scrambling method based on one or more characteristics of a particular data set, the particular scrambling method may be more effective in reducing storage errors for the particular data set as compared to using a single scrambling method on all data sets to be stored in a non-volatile storage device regardless of data characteristics. A key indicator indicative of the scrambling method may be stored along with the scrambled data. To retrieve the data from storage, the scrambled data and the key indicator may be retrieved from a memory device and a descrambling operation may be selected based on the key indicator. The scrambled data may be descrambled according to the selected descrambling operation, producing descrambled data that may be output at an output interface.

Figure 1:
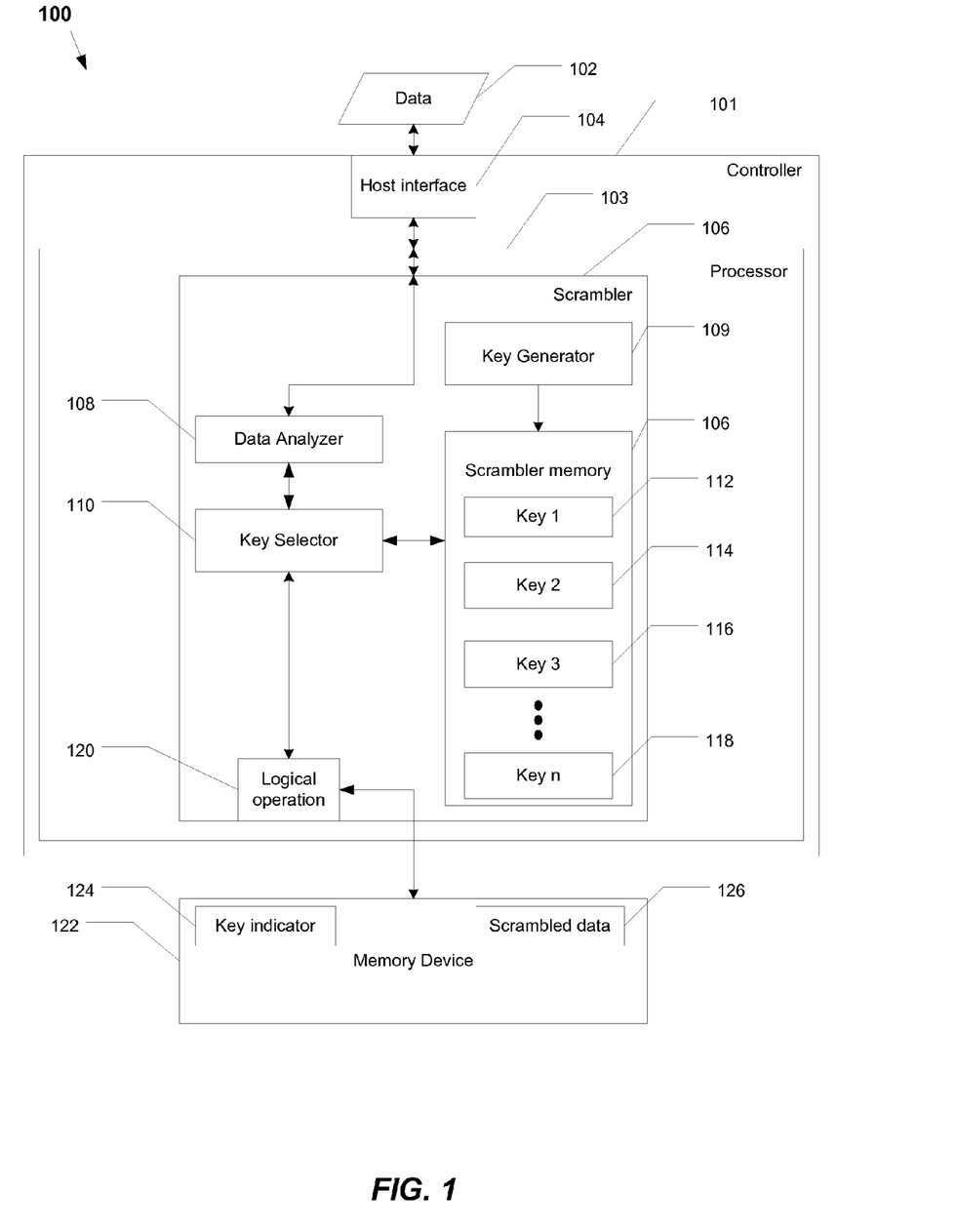
FIG. 1 depicts an apparatus that includes a processor to perform a scrambling operation.

FIG. 1 depicts an apparatus that includes a processor to perform a scrambling operation. The apparatus 100 may include a controller 101. The controller 101 may include a processor 103 and a host interface 104. The processor 103 may include a scrambler 106. The scrambler 106 may include a data analyzer 108, a key selector 110, a key generator 109, and a scrambler memory 106. The processor 103 may be coupled to a memory device 122. For example, the memory device 122 may include a flash memory device. In another example, the memory device 122 may include a static random access memory device.

The apparatus 100 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the apparatus 100 may be embedded memory in a host device, such as eMMC® memory (trademark of JEDEC Solid State Technology Association, Arlington, Va.) and eSD memory, as illustrative examples. For example, the host device may include a mobile telephone, a music or video player, a gaming console, an electronic book reader, a personal digital assistant (PDA), a computer such as a laptop computer, notebook computer, or tablet, any other electronic device, or any combination thereof.

The processor 103 may be configured to receive data 102 via the host interface 104 and to select a scrambling operation from at least a first scrambling operation and a second scrambling operation. The first scrambling operation may be associated with a first key 112, and the second scrambling operation may be associated with a second key 114. The processor 103 may apply the selected scrambling operation to the data 102 to produce scrambled data 126 prior to writing the scrambled data 126 to the memory device 122. The scrambling operation may be selected based on a transition characteristic associated with the data 102.

In operation, the controller 101 may receive the data 102 from a host (not shown) via the host interface 104 and may provide the data 102 to the processor 103. Within the processor 103, the data 102 may be input to the scrambler 106. Within the scrambler 106, the data 102 may be input to the data analyzer 108. The data analyzer 108 may perform an analysis of the data 102. Results of the analysis may be used to determine selection of a key with which to scramble the data 102.

Figure 2:
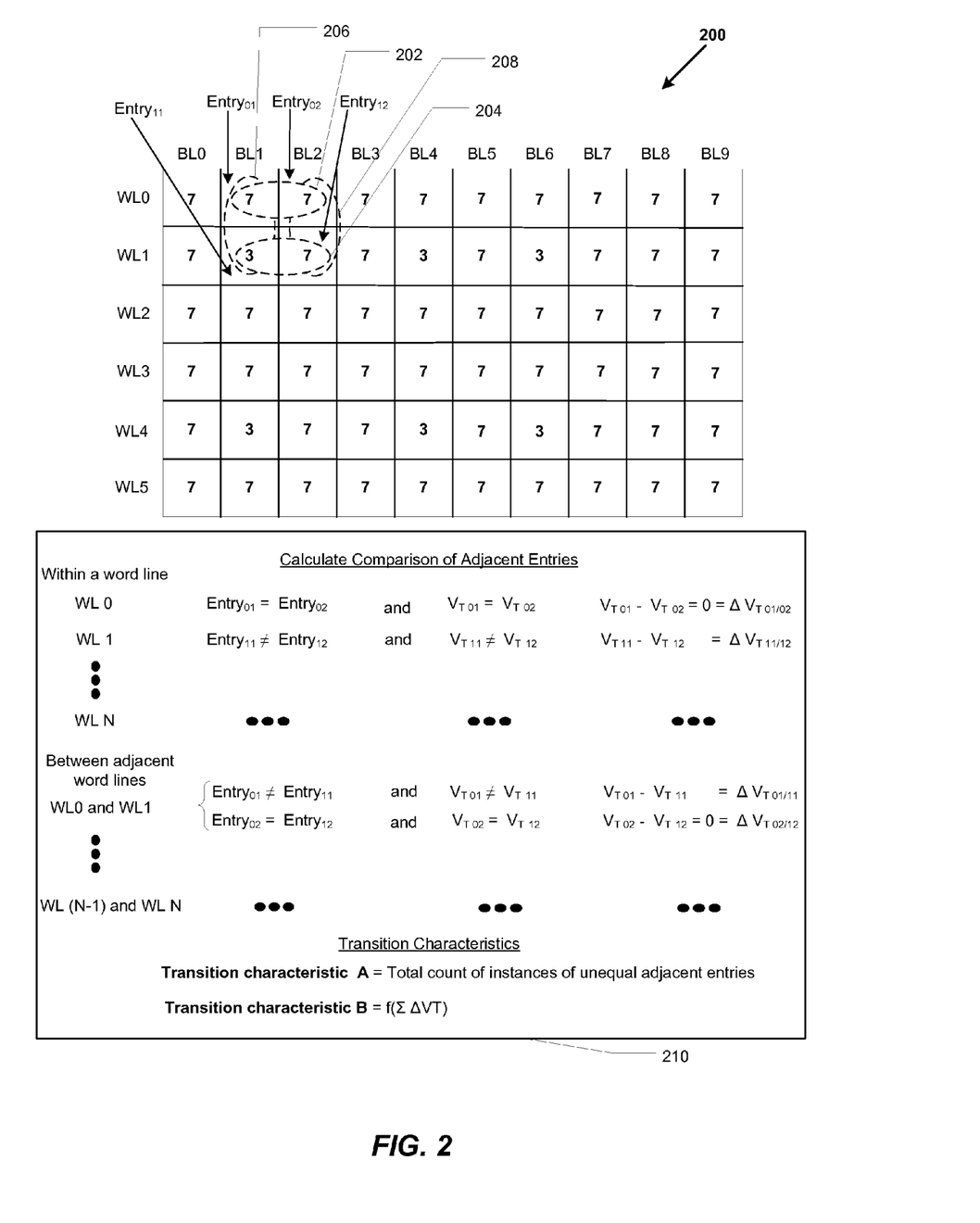
FIG. 2 depicts a set of data entries corresponding to data to be stored to a memory device.

For example, the data 102 may be analyzed to determine a transition characteristic associated with the data 102, as described with respect to FIG. 2. In a particular illustrative example, the transition characteristic may include a count of state differences between pairs of data entries that will be stored as nearest neighbors in the memory device 122. For example, a particular data entry may have four nearest neighbors when stored in the memory device 122. Prior to storage of the data 102, state differences for each particular data entry may be determined by comparing the particular data entry with each of its nearest neighbors, assigning a state difference of "1" for each instance in which the particular data entry differs from that of a nearest neighbor, and assigning a state difference of "0" for each instance in which the particular data entry is the same as a nearest neighbor. The count of state differences may be determined by summing, for all data entries, the state differences with all nearest neighbors. In another particular illustrative example, the transition characteristic may be based at least in part on threshold voltage differences associated with nearest neighbor data entries within the received data 102. For example, the particular data entry may correspond to a threshold voltage ($V_T$) when stored in the memory device 122. The transition characteristic may be calculated by calculating differences in $V_T$ of each data entry and its nearest neighbors and adding all calculated differences in $V_T$ for all data entries. In yet another particular illustrative example, the transition characteristic may be calculated as a function of a sum of the threshold voltage differences of nearest neighbors for all data entries of the data 102.

The key generator 109 may generate a plurality of keys. Any of the plurality of keys may be used as a scrambling key to scramble the data 102, such as by performing a bit-wise exclusive-OR (XOR) of the data 102 with the selected scrambling key. The keys generated by the key generator 109 may be stored in the scrambler memory 106. The stored keys may include the first key 112, the second key 114, a third key 116, and one or more other keys including an $n^{th}$ key 118. In an example implementation, the first key 112 is different from the second key 114, and a scrambling operation using the first key 112 may produce a different result than a scrambling operation using the second key 114.

The key selector 110 may select one of the keys stored in the scrambler memory 106. Key selection may be based on the results of analysis carried out by the data analyzer 108. For example, results of the data analysis performed by the data analyzer 108 may include a transition characteristic associated with the data 102, such as a sum of state differences between nearest neighbor data entries, or a sum of $V_T$ differences between nearest neighbor data entries. After the key selector 110 has selected one of the keys 112-118 stored in the scrambler memory 106, the processor 103 may perform a logical operation 120 on the data 102 using the selected key as the scrambling key to generate the scrambled data 126. For example, the logical operation 120 may include performing a logical combination, such as a bit-wise exclusive-XOR operation, of the received data 102 with the selected scrambling key. After the logical operation 120 is performed, the processor 103 may output the scrambled data 126 to be stored in the memory device 122. The processor 103 may also output an indication of the selected key that may be stored in the memory device 122. For example, a key indicator 124, such as a key index that identifies the selected key of keys 112-118, or a key name of the selected key, may be stored in the memory device 122.

Upon receiving a request for the data 102 from a requested device, such as a host device or other external device or component, the controller 101 may retrieve the scrambled data 126 from the memory device 122 and the key indicator 124 from the memory device 122. The scrambled data 126 and the key indicator 124 may be input to the processor 103 within the controller 101. In the processor 103, an inverse logical operation may be executed, e.g., an inverse of the logical operation 120 using the scrambled data 126 and the key indicator 124. For example, the inverse of the logical operation 120 may be a bit-wise exclusive-XOR operation of the scrambled data 126 and the key indicated by the key indicator 124. The inverse logical operation may descramble the scrambled data 126 to generate the data 102. The data 102 may then be output via an output interface, such as the host interface 104, to the requesting device.

Measurements may be made of storage errors for a particular data set that is scrambled using a particular scrambling key and a particular scrambling operation prior to storage errors, and storage errors for the first set data that has not been scrambled prior to storage. Similar measurements may be carried out for each of a plurality of data sets using a plurality of scrambling keys and a plurality of scrambling operations. A data characteristic may also be calculated for each data set. For each data set, at least one of the scrambling keys and at least one of the scrambling operations may be found to result in fewer storage errors than if the data were stored without scrambling. Based upon the measurements of storage errors, a look-up table may be constructed that matches each data characteristic of each data set to a selected scrambling key and/or a selected scrambling operation. By choosing the selected key and/or the selected scrambling operation with which to scramble the data 102 based on a corresponding transition characteristic of the data 102, the scrambled data 126 that is stored in the memory device 122 may be less susceptible to errors due to proximity storage effects than if the data 102 were not scrambled prior to storage in the memory device 122.

FIG. 2 depicts a set of data entries corresponding to data to be stored to a memory device, such as the data 102 of FIG. 1. A grid 200 depicts the data entries laid out to illustrate how the data entries may be written in a memory device, such as the memory device 122 of FIG. 1 or the memory device 616 of FIG. 6. Prior to storing the data in the memory device, a corresponding memory location (e.g., a storage element of the memory device) may be determined for each data entry. For example, $Entry_{01}$ may be projected to be stored at word line 0 (WL0) and bit line 1 (BL1) of a memory (not shown). $Entry_{02}$ may be projected to be stored at word line WL0, bit line BL2. $Entry_{11}$ may be projected to be stored at word line WL1 and bit line BL1. $Entry_{12}$ may be projected to be stored at word line WL1 and bit line BL2. In similar fashion, each data entry may be projected to be stored at a corresponding memory location of the memory device, e.g., memory device 122 of FIG. 1 or memory device 616 of FIG. 6.

Considering a particular data entry, such as $Entry_{01}$, one or more neighbors (i.e., neighboring data entries in a same word line or a same bit line) may have a same data value, and one or more neighbors may have a different data value than $Entry_{01}$. For example, $Entry_{01}$ has neighbor $Entry_{02}$ with a same value ("7") to $Entry_{01}$. $Entry_{11}$ is also a neighbor of $Entry_{01}$ and $Entry_{11}$ has a value ("3") that differs from the value of $Entry_{01}$. Similarly, each particular data entry in the grid may have one or more neighbors with a same value to the particular data entry and/or one or more neighbors that differ in value from the particular data entry.

As illustrated, each data entry may correspond to a 3-bit value stored in a flash multi-level-cell (MLC) memory element. A value of "7" may represent a sequence of bits "111" stored in a single memory element. A value of "3" may represent a sequence of bits "011" stored in a single memory element. In a 3-bit MLC implementation, each memory element may have one of eight states, each state having a corresponding threshold voltage $V_T$ of the memory element. For example, a threshold voltage corresponding to "011" may be in a voltage range corresponding to highest allowable threshold voltages. A threshold voltage corresponding to "111" may be in another voltage range corresponding to lowest allowable threshold voltages (e.g., an erased state). As a result, neighboring cells having respective entries "3" and "7" may indicate a high likelihood of program disturb errors.

Distribution of the values may be a significant factor in predicting the likelihood of program disturb errors. For example, a pattern of data entries that have mostly values of "7", occasionally interspersed with values of "3", as illustrated in grid 200 of FIG. 2, may have a relatively low occurrence of storage errors that may be worsened by applying a scrambling operation. However, another pattern of data entries (not shown) that have mostly values of "3", occasionally interspersed with values of "7" may have a high occurrence of storage errors that may be improved by applying a scrambling operation. Although FIG. 2 illustrates particular data to be stored in multi-level cell (MLC) memory elements having three bits per cell, the data having values of "3" and "7," (which may map to corresponding highest and lowest values, respectively, of threshold voltage $V_T$), other values of data may be considered for storage. Data to be stored in MLC memory elements with three bits per memory element may have values ranging from "0" to "7". Data to be stored in multi cell memory elements with two bits per memory element may have values from "0" to "3". Data to be stored in a memory of single level cell (SLC) memory elements may have values from "0" or "1".

A first transition characteristic may be calculated for a set of data such as the set of data depicted in grid 200. The first transition characteristic may be based on differences in neighboring values for each particular entry. In another example, a second transition characteristic may be determined based on threshold voltage differences between neighboring entries.

To illustrate, a particular transition characteristic for the data set may be calculated prior to writing the data into the memory. For example, within data projected to be written into a first word line WL0, the data may be analyzed. Each instance in which a neighbor entry has a same value as a particular entry may be assigned a transition value of "0", and each instance in which a neighboring entry differs from the particular data entry may be assigned a transition value of "1".

Considering each of the data entries and each of their neighboring data entries, the first data transition characteristic for WL0 may be calculated by totaling transition values of adjacent entries. For example, a first sub-total may be calculated for a first plurality of pairs of data entries including each particular entry and its neighboring cells (also called neighboring memory elements herein) in adjacent word lines. A second sub-total may be calculated for a second plurality of pairs of data entries that includes adjacent entries (to be stored at neighboring cells) within the word line. The first data transition characteristic may be calculated as a total of the first sub-total and the second sub-total.

For example, $Entry_{02}$ of WL0 has a neighbor $Entry_{12}$ in WL1 that has a value equal to the value of the $Entry_{02}$. The transition value for the neighbor pair $Entry_{02}$/$Entry_{12}$ is therefore "0". As another example, the $Entry_{01}$ of WL0 is a neighbor of $Entry_{11}$ of WL1. Because the $Entry_{01}$ differs from the $Entry_{11}$, the transition value for the neighbor pair $Entry_{11}$/$Entry_{01}$ is "1".

For each pair of adjacent entries, a transition value may be determined For example, a data pair 206 has unequal values and therefore the transition value for the data pair 206 is "1". A data pair 208 has equal values and therefore the transition value for the data pair 208 is "0". A data pair 202 contains equal values, and so the transition value for data pair 202 is "0" (zero). A data pair 204 has unequal values, and therefore the transition value for the data pair 204 is 1.

By considering each adjacent pair in adjacent word lines (a first plurality of pairs of data entries) and each adjacent pair in the same word line (a second plurality of pairs of data entries), a total count of instances of unequal adjacent entries may be determined A first data transition characteristic (transition characteristic A) for the data set may be determined as a sum of transition values and may be equal to a total count of instances of unequal adjacent entries, as illustrated in a calculation example 210. Each instance in which a neighbor has a same value as a particular entry is given a value of "0", and each instance in which a neighbor has a different value than that of a particular entry is given a value of "1".

A second transition characteristic (transition characteristic B) can be determined based on a threshold voltage associated with each entry. For example, adjacent entries having different values results in adjacent memory elements being programmed with different threshold voltages corresponding to different states. When adjacent entries have equal values, the corresponding memory elements may be programmed to a same state and may be deemed to have the same threshold voltage. Transition characteristic B can be determined by calculating a sum of differences in threshold voltages (i.e., a sum of differences of states) of neighboring memory elements. For each adjacent pair, a difference in threshold voltages (or states) is calculated and added to a sum of voltage threshold differences (or states). Transition characteristic B may be calculated as a function of the sum of the voltage threshold differences for all adjacent data pairs, as illustrated in the calculation example 210.

A particular transition characteristic may include transition characteristic A, transition characteristic B, or any combination thereof, including a function of transition characteristic A (e.g., [transition characteristic A]$^2$) or a function of transition characteristic B (e.g., [transition characteristic B]$^2$). The particular transition characteristic provided by the analysis 210 may be used in selecting a scrambling operation and/or a scrambling key. For example, the transition characteristic may be used to select a key from the scrambler memory 106 via the key selector 110 of FIG. 1, e.g., via use of a look-up table that includes one or more values of one or more transition characteristics and corresponding recommended scrambling keys. The selected key may be used to scramble the data 102. Although illustrated as a memory of 3-bit multi-level cells (MLC), the memory could be made up of 1-bit memory elements (single level cells, SLC), 2-bit memory elements, or other multi-bit MLC.

Figure 3:
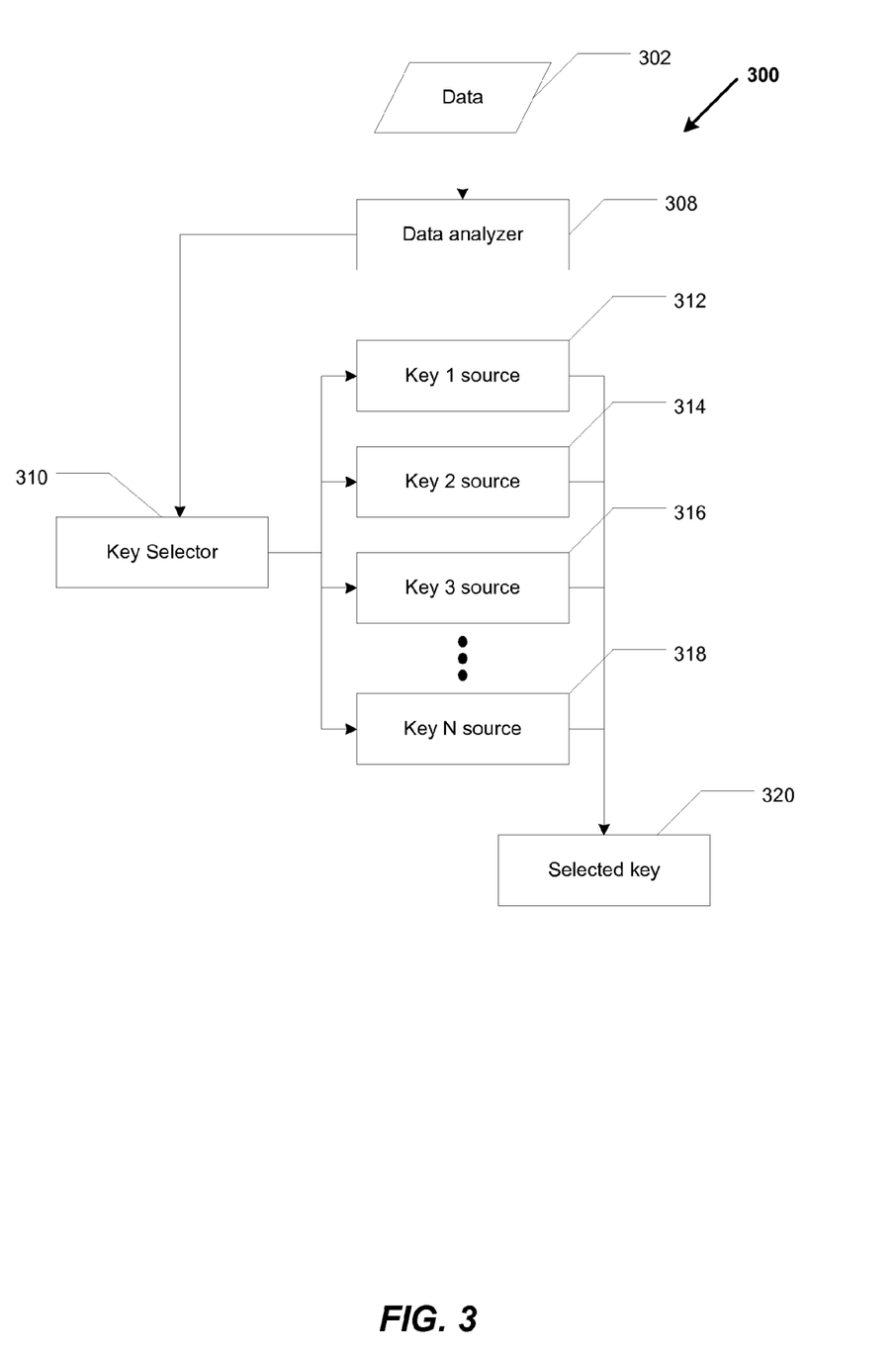
FIG. 3 depicts an embodiment of a portion of a scrambler to select a scrambling key to perform a scrambling operation.

FIG. 3 depicts an embodiment of a portion of a scrambler to select a scrambling key to perform a scrambling operation. Apparatus 300 includes a data analyzer 308 and a key selector 310. For example, the data analyzer 308 may be the data analyzer 108 of FIG. 1, and the key selector 310 may be the key selector 110 of FIG. 1.

Data 302 may be input to the data analyzer 308. The data analyzer 308 may analyze the data 302 and may determine one or more characteristics of the data 302, such as a transition characteristic of FIG. 2. For instance, a first transition characteristic may be determined by determining a count of state differences between pairs of data entries within the data 302, such as transition characteristic A of FIG. 2. In another example, the data analyzer 308 may determine a second transition characteristic that is based at least in part upon threshold voltage differences associated with at least one of a plurality of pairs of adjacent data entries within the data 302, such as transition characteristic B of FIG. 2.

The data analyzer 308 may determine a particular transition characteristic associated with the data 302 and may output the particular transition characteristic to the key selector 310. The key selector 310 may select a particular key from amongst a plurality of keys, the selection based on the particular transition characteristic received from the data analyzer 308. For example, a look-up table may be constructed, based upon theoretical, simulated, or experimental results indicating a count of data storage errors for various transition characteristic values, in a first scenario where scrambling is applied to the data, and in a second scenario where no scrambling applied to the data. The table may include results determined for each of a plurality of scrambling keys. The look-up table may be used by the key selector 310 to select a particular scrambling key with which to scramble the data 302 in order to reduce storage errors caused by proximity effects. The look-up table may be constructed based on, e.g., transition characteristic A or transition characteristic B of FIG. 2. The key selector 310 may output a selected key 320 that is generated by a selected key source. For example, the key selector 310 may select one of key 1 source 312, key 2 source 314, key 3 source 316, or any of a plurality of key sources including key N source 318 based upon the particular transition characteristic. Each key source 312-318 may be a memory storing a key, such as the scrambler memory 106 of FIG. 1, or some other mechanism to generate a key, such as described with respect to FIGS. 4-6.

Figure 4:
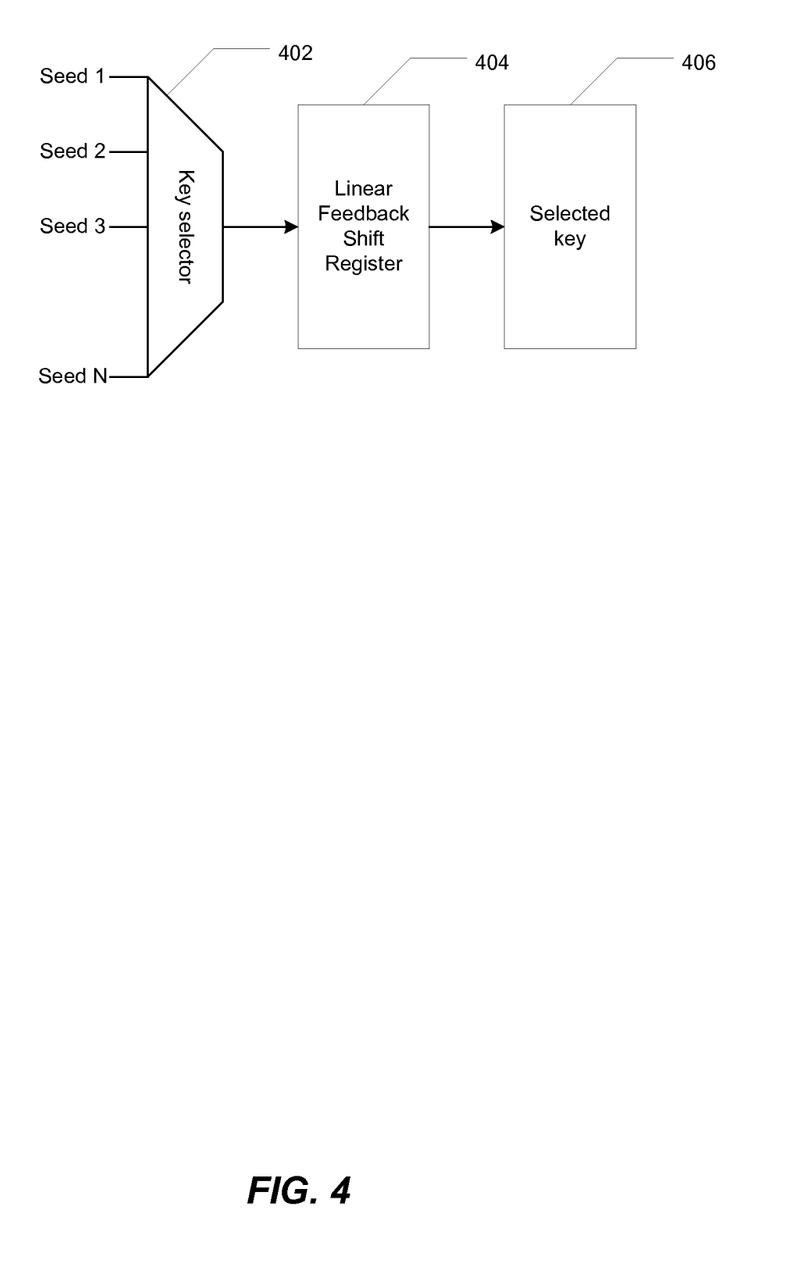
FIG. 4 is a block diagram of a particular embodiment of an apparatus to select a key used to scramble data.

FIG. 4 is a block diagram of a particular embodiment of an apparatus to select a key used to scramble data. The apparatus includes a key selector 402 and a linear feedback shift register (LFSR) 404. For example, the key selector 402 may be a multiplexer. The key selector 402 may be incorporated in the key selector 110 of FIG. 1.

In operation, the key selector 402 may select a particular seed from among a plurality of seeds including seed 1, seed 2, seed 3, and one or more other seeds including seed N. The key selector 402 may select a seed from amongst the plurality of seeds based on an analysis received from a data analyzer (not shown), such as the data analyzer 108 of FIG. 1. For example, the analysis of the data analyzer 108 may identify a transition characteristic associated with data, such as the data 102 that is input to the controller 101 of FIG. 1. For example, the transition characteristic may be determined based on a count of state differences between pairs of data entries within received data. In another example, the transition characteristic may be determined based at least in part upon threshold voltage differences associated with at least one of a plurality of pairs of adjacent data entries within the received data. The transition characteristic produced by the data analyzer 108 may be used by the key selector 402 to select a particular seed from among seed 1, seed 2, seed 3, . . . seed N, via, e.g., a look-up table (described above with regard to FIGS. 2 and 3).

The key selector 402 may output a particular seed selected from the plurality of available seeds as an input seed to the linear feedback shift register 404. For example, the key selector may select the particular seed based upon a look-up table, such as the look-up table described above. The linear feedback shift register 404 may output a selected key 406 based on the selected seed.

Figure 5:
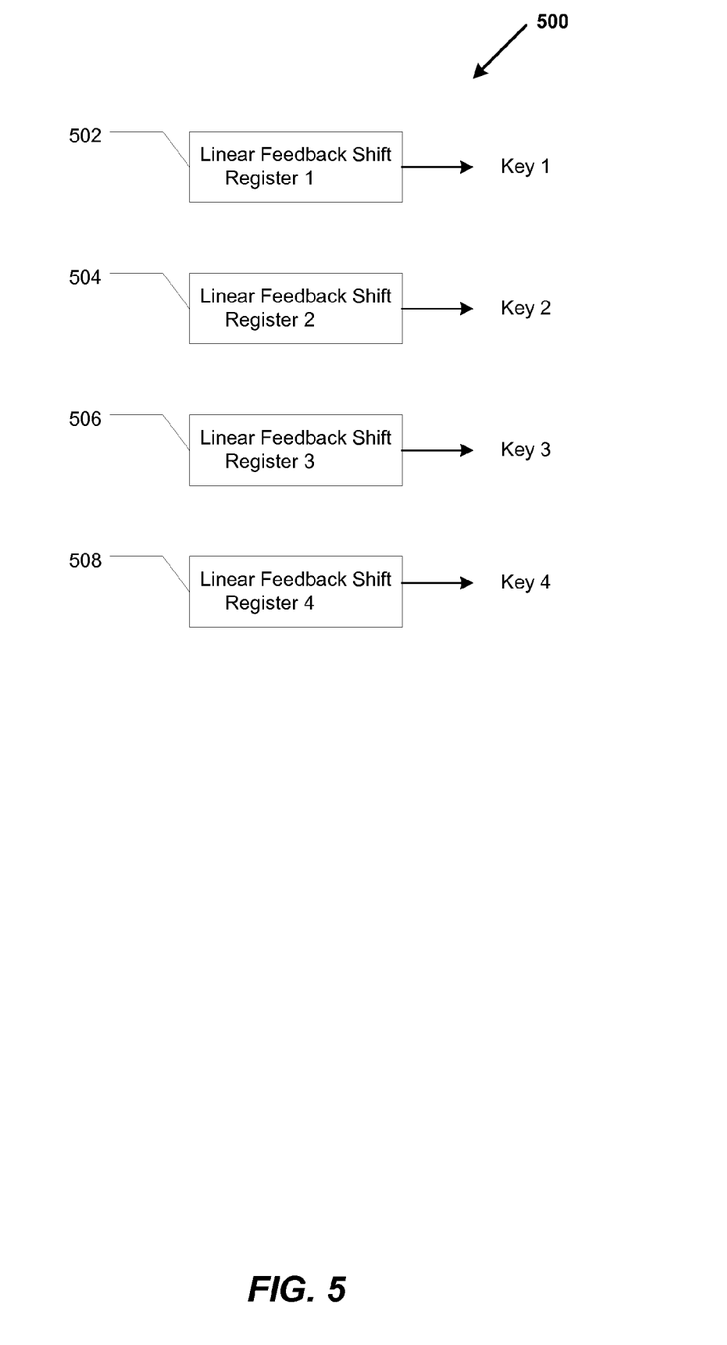
FIG. 5 is a is a block diagram of another particular embodiment of an apparatus to select a key used to scramble data.

FIG. 5 is a block diagram of another particular embodiment of an apparatus to select a key used to scramble data. The apparatus 500 may include a first linear feedback shift register 502, a second linear feedback shift register 504, a third linear feedback shift register 506, and a fourth linear feedback shift register 508. Each of the first linear feedback shift register 502, the second linear feedback shift register 504, the third linear feedback shift register 506, and the fourth linear feedback shift register 508 may differ from one another. The first linear feedback shift register 502 may be configured to output a first key. The second linear feedback shift register 504 may be configured to output a second key. The third linear feedback shift register 506 may be configured to output a third key. The fourth linear feedback shift register 508 may be configured to output a fourth key.

In operation, output from a data analyzer, such as the data analyzer 108 of FIG. 1, may be used to select one of the linear feedback shift registers 502, 504, 506, and 508. The selection of a particular linear feedback shift register may be accomplished based on an analysis provided by the data analyzer. For example, the data 102 of FIG. 1 may be input to the data analyzer 108. The data analyzer 108 may select one of the linear feedback shift registers 502-506 based on one or more transition characteristics of the data 102, such as described with respect to FIG. 2. For example, the data analyzer 108 may select one of the linear feedback shift registers 502-506 based upon a look-up table that associates each of a plurality of values of a transition characteristic with a corresponding linear feedback shift register. The look-up table of linear feedback shift registers may include one or more recommended linear feedback shift registers for each of a plurality of values of one or more transition characteristics. For instance, the look-up table may provide one or more corresponding recommended linear feedback shift registers to scramble the data for each of various values of transition characteristic A of FIG. 2, and may also provide one or more corresponding recommended linear feedback shift registers to scramble the data for each of various values of transition characteristic B of FIG. 2. In some instances, the look-up table may indicate that it would be more effective to not scramble the data prior to storage to avoid increasing a count of storage errors due to proximity effects.

Figure 6:
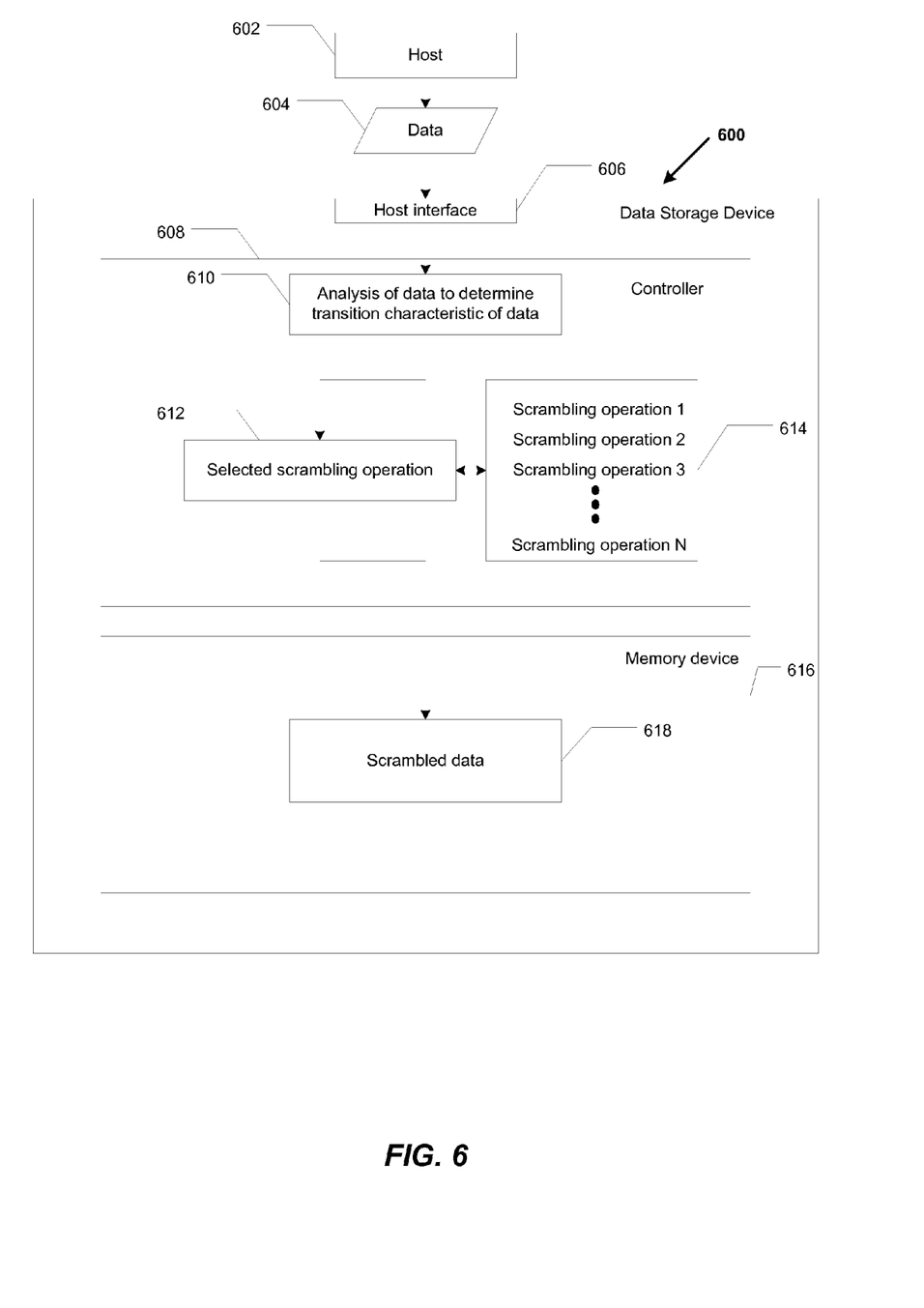
FIG. 6 is a block diagram of an embodiment of an apparatus to scramble data based on a transition characteristic of the data.

FIG. 6 is a block diagram of an embodiment of an apparatus including a data storage device 600 and including a controller 608 to scramble data based on a transition characteristic of the data. The data storage device 600 may include a host interface 606 that may be coupled to a host 602 and to the controller 608. The controller 608 may be coupled to memory device 616.

In operation, the host device 602 may provide data 604 to the data storage device 600 via the host interface 606. The host device 602 may be configured to provide data 604 to be stored at the data storage device 600 or to request data to be read from the data storage device 600. For example, the host device 602 may include a mobile telephone, a music or video player, a gaming console, an electronic book reader, a personal digital assistant (PDA), a computer such as a laptop computer, notebook computer, or tablet, any other electronic device, or any combination thereof.

The controller 608 may perform an analysis 610 of the data 604, the analysis 610 identifying a transition characteristic associated with the data 604. For example, the transition characteristic may be determined by determining a count of state differences between pairs of data entries within the data 604, such as transition characteristic A of FIG. 2. In another example, the transition characteristic may be based at least in part upon threshold voltage differences associated with at least one of a plurality of adjacent data entries within the data 604, such as transition characteristic B of FIG. 2.

The controller 608 may select a scrambling operation based at least in part on the analysis 610. For instance, the scrambling operation may be selected based on the transition characteristic determined via the analysis 610. A selected scrambling operation 612 is selected from a plurality of scrambling operations 614 including scrambling operation 1, scrambling operation 2, scrambling operation 3, and one or more scrambling operations up to scrambling operation N (N is an integer greater than 3). The selected scrambling operation may be selected from a look-up table. The look-up table of linear feedback shift registers may include one or more recommended scrambling operations for each of a plurality of values of one or more transition characteristics. For instance, the look-up table may provide one or more recommended scrambling operations to scramble the data for each of various values of transition characteristic A of FIG. 2. Alternatively, the look-up table may provide one or more recommended scrambling operations to scramble the data for each of various values of transition characteristic B of FIG. 2. In some instances, the look-up table may indicate that not scrambling the data prior to storage in the memory device 616 results in fewer storage errors due to proximity effects than scrambling the data prior to storage in the memory device 616.

The controller 608 may scramble the data 604 according to the selected scrambling operation 612 to produce scrambled data 618. The scrambled data 618 may be output from the controller 608 and stored in the memory device 616.

To illustrate, one or more of the scrambling operations 614 may be an XOR with a selected key. As another example, one or more of the selected scrambling operations 614 may be "no scrambling performed" (e.g., when the data 604 is sufficiently random). As another example, one or more of the selected scrambling operations 614 may be a series of XOR operations, with each XOR operation using a different key. Alternatively, or in addition, one or more of the selected scrambling operations 614 may be a combination of any of the aforementioned scrambling operations.

Figure 7:
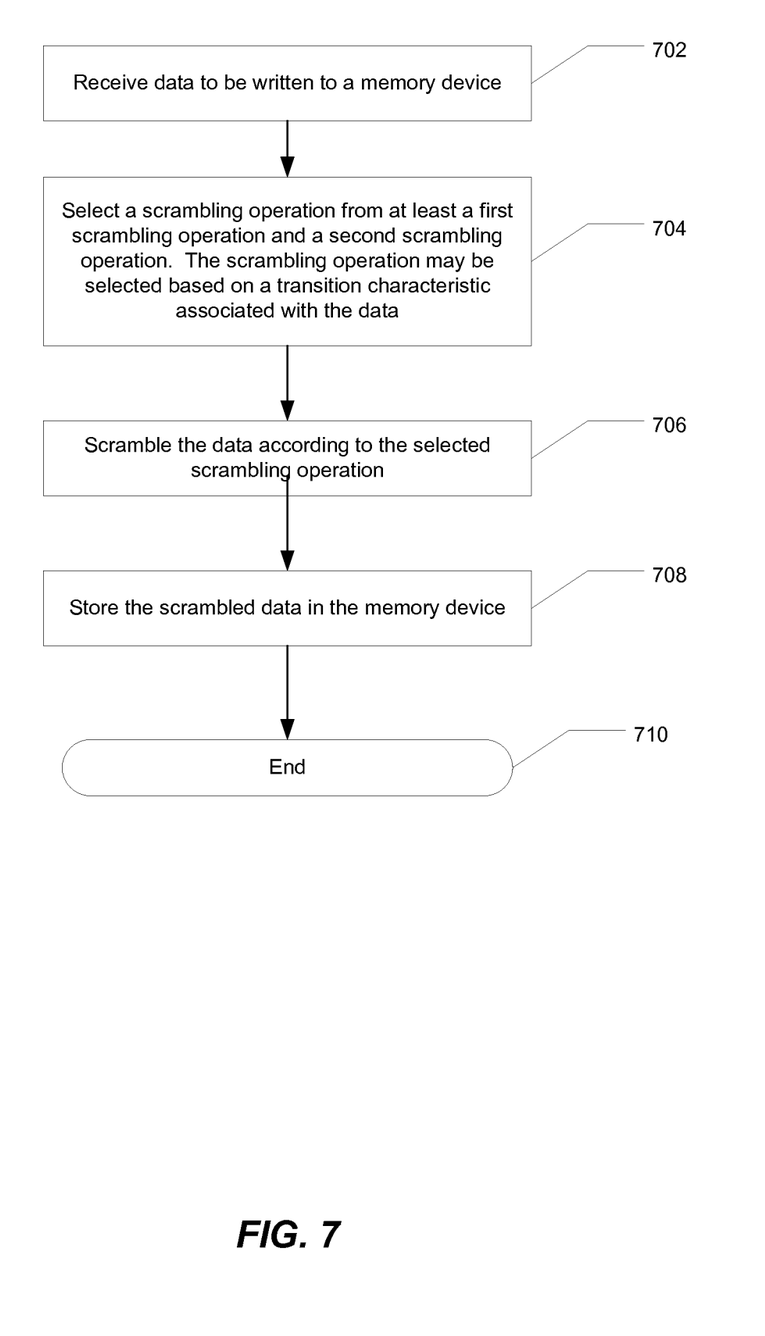
FIG. 7 depicts a particular embodiment of a method of storing data.

FIG. 7 depicts a particular embodiment of a method of storing data. The method may be performed by the apparatus 100 or by the data storage device 600, as examples. Data that is to be written to a memory device may be received, at 702. A scrambling operation may be selected from at least a first scrambling operation and a second scrambling operation based on a transition characteristic associated with the data, at 704. For example, an XOR operation may be performed using a selected key such as one of key 112, key 114, and key 116 of FIG. 1. The determined transition characteristic may be a function of a sum of instances of unlike values of neighboring memory elements, a function of a sum of transition voltage differences between neighboring memory elements, another transition characteristic, or a combination thereof. The data may be scrambled according to the selected scrambling operation, at 706. The scrambled data may be stored in the memory device, at 708. The method ends at 710.

Figure 8:
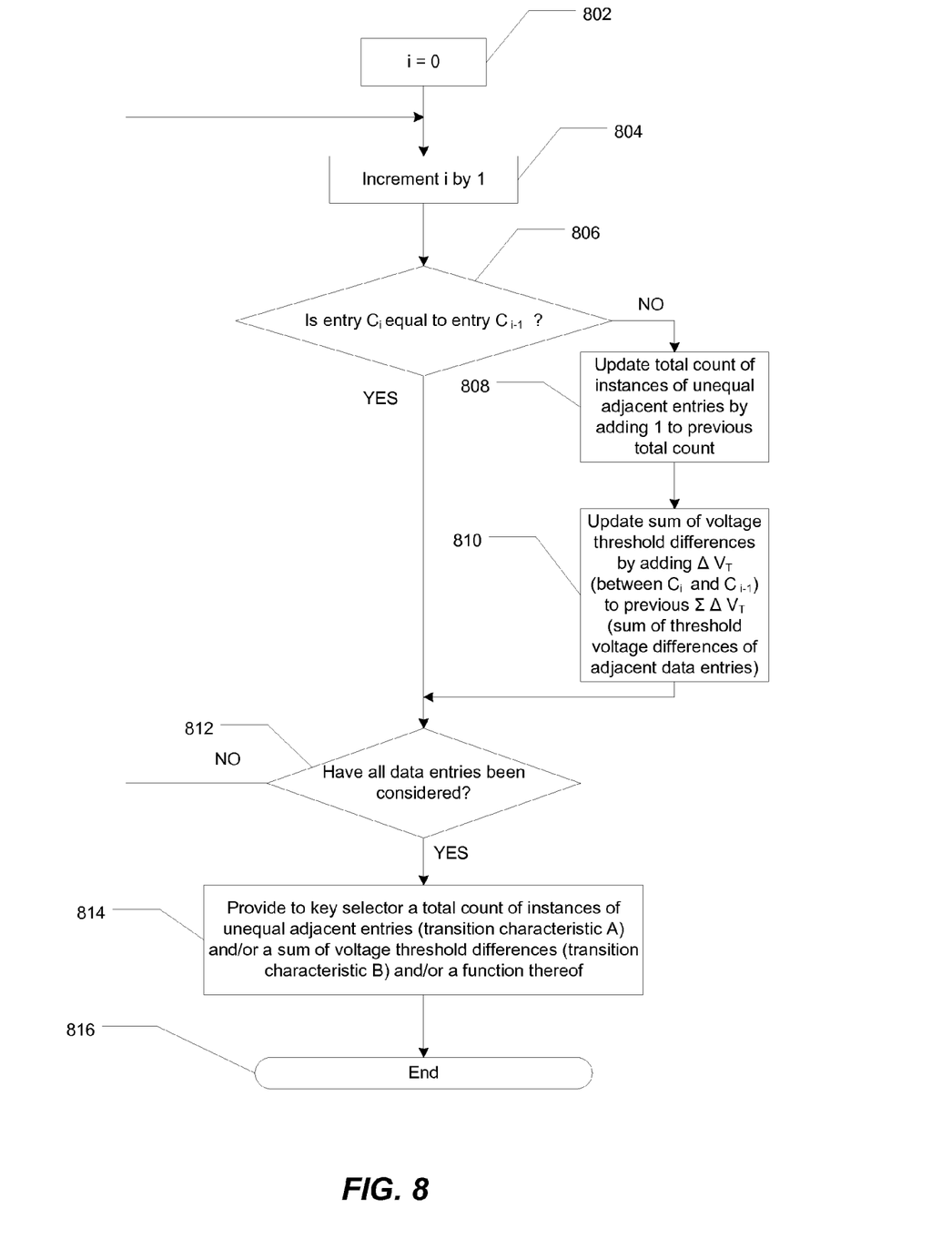
FIG. 8 is a flow chart of an embodiment of a method of determining one or more transition characteristics associated with data.

FIG. 8 depicts a particular embodiment of a method of determining one or more transition characteristics associated with data such as the data 102 of FIG. 1, the data 302 of FIG. 3, or the data 604 of FIG. 6. An index i is initially set to a value of "0", at 802. The index is incremented by 1, at 804. A comparison of a data entry $C_i$ to a neighbor data entry is evaluated, at 806. In response to determining that $C_i$ is unequal to $C_{i-1}$, a total count of instances of unequal adjacent entries is increased by 1 from the previous total count, at 808, and a sum of voltage threshold differences between neighboring entries is updated by adding a difference between the threshold voltages of $C_i$ and $C_{i-1}$ to the previous sum of threshold voltage differences of adjacent data entries, at 810. When additional data entries remain to be considered, at 812, the method returns to 804, incrementing the index by 1 and repeating the comparison at 806. In response to determining that all data entries have been considered, at 812, a total count of instances of unequal adjacent entries (i.e., transition characteristic A of FIG. 2) and a sum of voltage threshold differences (i.e., transition characteristic B of FIG. 2) is calculated and provided to a key selector, at 814. A transition characteristic may be calculated as a function of the first transition characteristic, the second transition characteristic, or any combination thereof. (For example, the transition characteristic may be equal to the first transition characteristic. In another example, the transition characteristic may be f(transition)=1/N [$\Sigma(\Delta V_T)$, n=0 to N]). The method ends at 816. Although FIG. 8 may illustrate a 1-dimensional case (e.g., along a single word line), in other embodiments two dimensions could be used, such as including transitions between memory elements of adjacent word lines.

Figure 9:
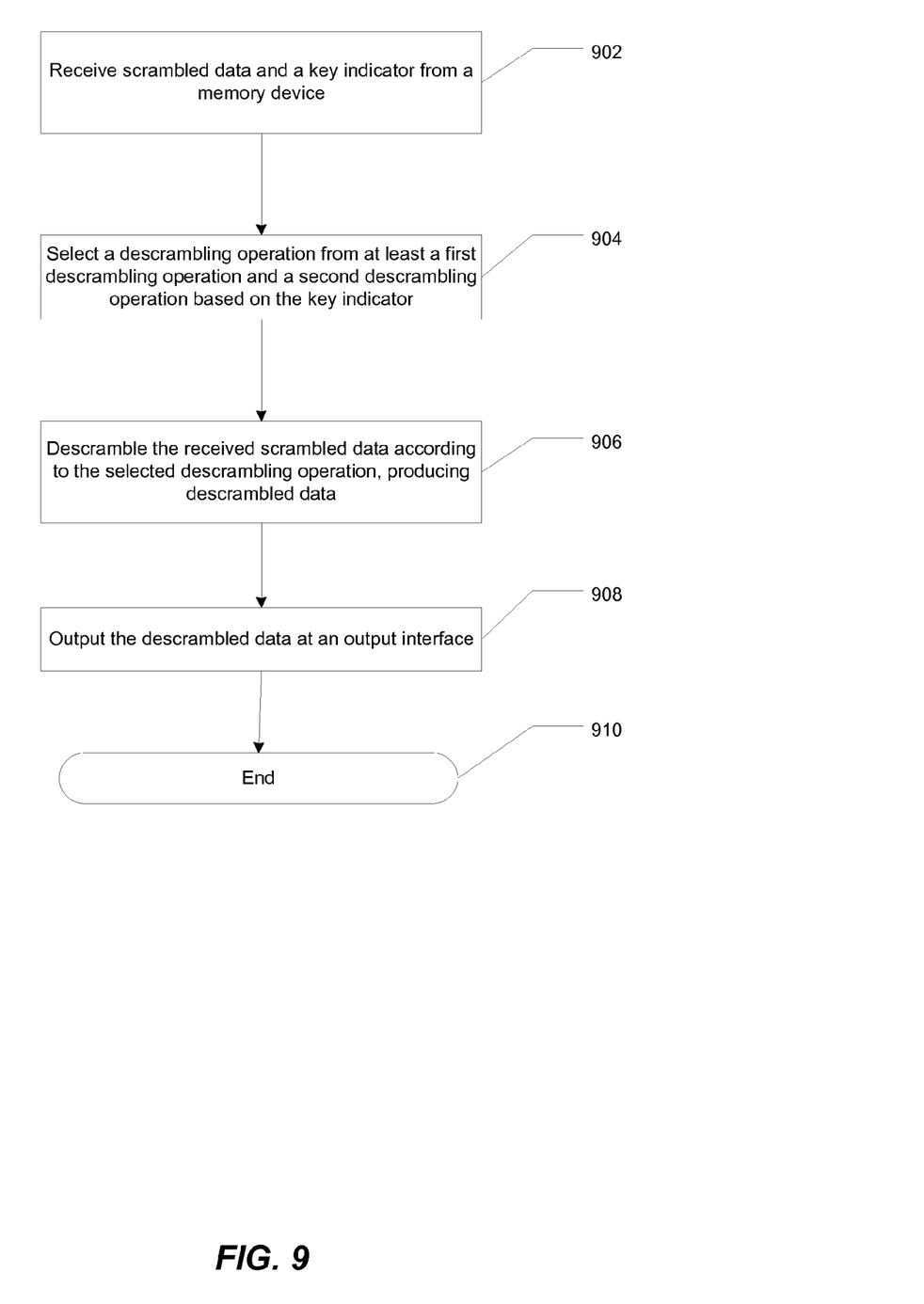
FIG. 9 depicts a method of descrambling data that has been scrambled.

FIG. 9 depicts a method of descrambling data that has been scrambled. The method may be performed by, e.g., the apparatus 100 of FIG. 1. Scrambled data is received and a key indicator that identifies a scrambling key is received from a memory device, at 902. A descrambling operation is selected from at least a first descrambling operation and a second descrambling operation, based upon the key indicator, at 904. For example, the descrambling operation may use the scrambling key identified by the key indicator in an XOR operation on the scrambled data. In another example, a nonvolatile memory may store a first seed of a linear feedback shift register, the first seed associated with the first scrambling operation, and the nonvolatile memory may store a second seed of the linear feedback shift register, the second seed associated with the second descrambling operation. The scrambling operation may be selected to scramble the data as one of the first scrambling operation and the second scrambling operation. The selection may be determined from, e.g., a look-up table associating each of a plurality of values of a particular transition characteristic with one or more recommended scrambling operations. The look-up table may be constructed based on experimental data of storage errors for various values of the particular transition characteristic, and applying each of one or more scrambling operations. For example, the look-up table may indicate that, for a value of a selected transition characteristic associated with the data 604, the first scrambling operation (using the first seed) prior to storage in the memory device 616 is likely to result in fewer storage errors (due to proximity effects) than if the data 604 were not scrambled prior to storage in the memory device 616. The descrambling operation may be selected based on the scrambling operation that has been selected.

For instance, when the first seed is used to scramble data, a descrambling operation selected may use the first seed to produce a first descrambling key. The descrambling operation may be an inverse of the scrambling operation, and the first seed can be used to produce the first descrambling key to descramble the scrambled data using the same (or a similar) operation that was used for scrambling the data. Alternatively, the first scrambling key may be retrieved for descrambling by accessing a key indicator, such as the key indicator 124 that is stored in the memory device 122 that identifies a key used to scramble the data 102, and the identified key can be used to descramble the data 102. The scrambled data is descrambled according to the selected descrambling operation, producing descrambled data, at 906. The descrambled data may be output at an output interface, at 908. The method ends at 910. In one example, the selected descrambling operation is an inverse operation of a selected scrambling operation applied to produce the scrambled data from original data, and the selected scrambling operation is selected from a plurality of selectable scrambling operations based on a transition characteristic associated with the original data prior to storing the scrambled data. For example, the selected scrambling operation may be carried out by scrambling via a bitwise XOR operation using a selected scrambling key. The descrambling operation may be carried out by carrying out a bitwise XOR operation of the scrambled data with the same selected scrambling key, to produce the descrambled data.

Although various components depicted herein are illustrated as block components and described in general terms, such components may include one or more microprocessors, state machines, or other circuits configured to enable the apparatus 100 of FIG. 1 or the data storage device 600 of FIG. 6 to perform the particular functions attributed to such components, or any combination thereof. For example, the scrambler 106 of FIG. 1 may represent a physical component, such as a hardware controller, a state machine, a logic circuit, or another structure to enable the apparatus 100 of FIG. 1 to scramble the data 102 and the controller 101 may include a physical component such as a hardware controller, a state machine, a logic circuit, or another structure to store the scrambled data 126 in the memory device 122.

As another example, one or more components of the scrambler 106 may be implemented as processor-executed instructions. For example, the data analyzer 108 may be implemented using a microprocessor or microcontroller programmed to determine one or more transition characteristics of the data 102. In a particular embodiment, the data storage device 100 of FIG. 1 includes executable instructions that are executed by a processor 103 and the instructions are stored at the memory device 122 or in a random access memory (not shown). Alternatively, or in addition, executable instructions that are executed by the processor 103 may be stored at a separate memory location that is not part of the memory 122, such as at a read-only memory (ROM) (not shown).

In a particular embodiment, the data storage device 100 may be a portable device configured to be selectively coupled to one or more external devices. However, in other embodiments, the data storage device 100 may be attached or embedded within one or more host devices, such as within a housing of a portable communication device. For example, the data storage device 100 may be within a packaged apparatus such as a wireless telephone, a personal digital assistant (PDA), a gaming device or console, a portable navigation device, a computer device, or other device that uses internal non-volatile memory. In a particular embodiment, the data storage device 100 includes a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of non-volatile memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

What is claimed is:

1. A method comprising:
   receiving data including multiple bit groups, the data to be written to a memory device;
   selecting a scrambling operation from at least a first scrambling operation and a second scrambling operation, wherein the scrambling operation is selected based on a transition characteristic based on a transition between a first bit group of the multiple bit groups that corresponds to a first threshold voltage and a second bit group of the multiple bit groups that corresponds to a second threshold voltage;
   scrambling the data according to the selected scrambling operation; and
   storing the scrambled data in the memory device.

2. The method of claim 1, wherein the transition characteristic includes a count of state differences between pairs of data entries within the data.

3. The method of claim 1, wherein the first bit group indicates a first value, wherein the second bit group indicates a second value, wherein the first threshold voltage corresponds to storage of the first value at a first storage element, and wherein the second threshold voltage corresponds to storage of the second value at a second storage element.

4. The method of claim 1, wherein the transition characteristic is based at least in part upon threshold voltage differences associated with at least one of a plurality of pairs of adjacent data entries within the data.

5. The method of claim 4, wherein the plurality of pairs of adjacent data entries includes:
   a first plurality of pairs of data entries, wherein for each pair of the first plurality, a first data entry of the pair is to be stored in a corresponding word line and adjacent to a second data entry of the pair, the second data entry to be stored in another word line that is adjacent to the corresponding word line; and
   a second plurality of pairs of data entries, wherein for each pair of the second plurality, a first data entry of the pair is to be stored in a respective word line and adjacent to a second data entry of the pair, the second data entry to be stored in the respective word line.

6. The method of claim 1, wherein the memory device includes a flash memory device.

7. The method of claim 1, wherein the memory device includes a static random access memory (SRAM) device.

8. The method of claim 1, further comprising storing an indication of the selected scrambling operation in the memory.

9. The method of claim 1, further comprising in response to a request for the data, retrieving the scrambled data and descrambling the scrambled data according to a descrambling operation that is an inverse of the selected scrambling operation to produce descrambled data.

10. The method of claim 1, wherein the first scrambling operation uses a first scrambling key and wherein the second scrambling operation uses a second scrambling key that is different from the first scrambling key.

11. The method of claim 1, wherein scrambling the data includes performing a logical combination of the data with a scrambling key associated with the selected scrambling operation.

12. The method of claim 1, wherein the first scrambling operation uses a first linear feedback shift register and wherein the second scrambling operation uses a second linear feedback shift register that is different from the first linear feedback shift register.

13. An apparatus to perform a scrambling operation, the apparatus comprising:
   an interface to receive data including multiple bit groups, the data to be scrambled prior to being stored at a memory device; and
   a processor to:
      select a scrambling operation from at least a first scrambling operation and a second scrambling operation and to apply the scrambling operation to the data to produce scrambled data prior to writing the scrambled data to the memory device, wherein the scrambling operation is selected based on a transition characteristic based on a transition between a first bit group of the multiple bit groups that corresponds to a first threshold voltage and a second bit group of the multiple bit groups that corresponds to a second threshold voltage.

14. The apparatus of claim 13, wherein the processor is further to determine the transition characteristic by determining a count of state differences between pairs of data entries within the data.

15. The apparatus of claim 13, wherein the processor is further to determine the transition characteristic based at least in part upon threshold voltage differences associated with at least one of a plurality of pairs of adjacent data entries within the received data.

16. The apparatus of claim 15, wherein the plurality of pairs of adjacent data entries includes each pair of data entries to be stored in neighboring cells of adjacent word lines and each pair of data entries to be stored in neighboring cells of a common word line.

17. The apparatus of claim 13, wherein the memory device includes a flash memory device.

18. The apparatus of claim 13, wherein the memory device includes a static random access memory (SRAM) device.

19. An apparatus comprising:
a processor to:
   select a descrambling operation from at least a first descrambling operation and a second descrambling operation, wherein the selected descrambling operation is an inverse operation of a selected scrambling operation applied to produce scrambled data from data, wherein the data includes multiple bit groups, wherein the selected scrambling operation was selected from a plurality of selectable scrambling operations based on a transition characteristic prior to storing the scrambled data, and wherein the transition characteristic is based on a transition between a first bit group of the multiple bit groups that corresponds to a first threshold voltage and a second bit group of the multiple bit groups that corresponds to a second threshold voltage; and
   descramble, according to the selected descrambling operation, the scrambled data that is stored in a memory device, producing descrambled data; and
an output interface to output the descrambled data.

20. The apparatus of claim 19, further comprising a non-volatile memory storing:
   a first seed of a linear feedback shift register, the first seed associated with the first descrambling operation; and
   a second seed of the linear feedback shift register, the second seed associated with the second descrambling operation.

21. A method comprising:
receiving scrambled data and a key indicator from a memory device;
selecting a descrambling operation from at least a first descrambling operation and a second descrambling operation based on the key indicator; and
descrambling the scrambled data, producing descrambled data,
wherein the selected descrambling operation is an inverse operation of a selected scrambling operation applied to produce the scrambled data from original data,
wherein the original data includes multiple bit groups, and
wherein the selected scrambling operation is selected from a plurality of selectable scrambling operations based on a transition characteristic that is based on a transition between a first bit group of the multiple bit groups that corresponds to a first threshold voltage and a second bit group of the multiple bit groups that corresponds to a second threshold voltage.

22. The method of claim 21, wherein the transition characteristic is based at least in part upon threshold voltage differences associated with at least one of a plurality of pairs of adjacent data entries within the original data.

* * * * *